United States Patent [19]

Gilles et al.

[11] 3,776,571

[45] Dec. 4, 1973

[54] CASING FOR TRACK-LAYING AND WHEEL-EQUIPPED VEHICLES

[75] Inventors: Martin Gilles, Cologne; Anton Thiel, Garching/Alz, both of Germany

[73] Assignee: Clouth Gummiwerke AG, Cologne, Germany

[22] Filed: Oct. 14, 1971

[21] Appl. No.: 189,385

[30] Foreign Application Priority Data
Oct. 15, 1970 Germany.................. P 20 50 492.1

[52] U.S. Cl............................................ 280/154.5 R
[51] Int. Cl........................................... B62d 25/16
[58] Field of Search............................. 280/150.4 R

[56] References Cited
UNITED STATES PATENTS

| 3,248,126 | 4/1966 | Saxton | 280/154.5 R |
| 3,027,178 | 3/1962 | Eaves | 280/154.5 R |
| 2,714,015 | 7/1955 | Sherman | 280/154.5 R |
| 3,195,921 | 7/1965 | Robinson | 280/154.5 R |
| 3,089,712 | 5/1963 | Kosik | 280/154.5 R |

Primary Examiner—Robert R. Song
Attorney—Walter Becker

[57] ABSTRACT

A cover for track-laying and wheel-equipped vehicles, which, while consisting of elastic material, is variable in length.

3 Claims, 5 Drawing Figures

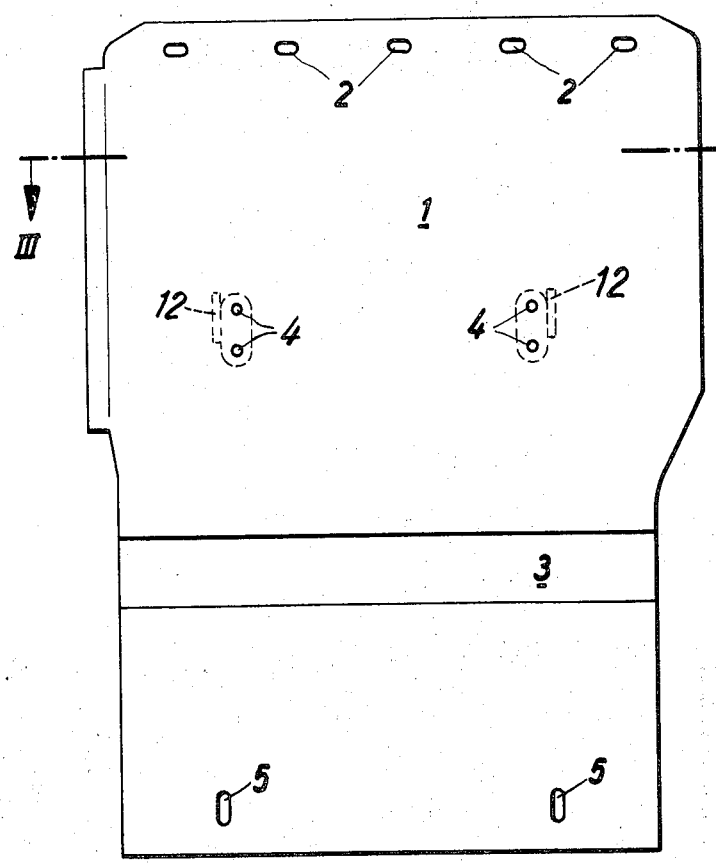
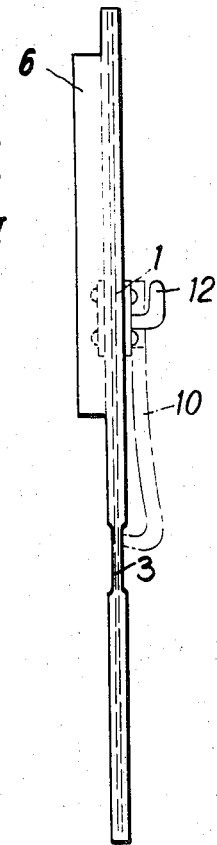
Fig.1    Fig.2
Fig.3

CASING FOR TRACK-LAYING AND WHEEL-EQUIPPED VEHICLES

The invention relates to a casing for track-laying and wheel-equipped vehicles, especially the casing for the rear of such vehicle.

It is an object of this invention to provide a casing of the above type which is to be used for ballistic protection and against the whirling up of dust and snow. It is also an object of this invention to provide a casing for the rear of the vehicle to prevent stones thrown up by the tracks or the wheels or track shoes thrown off, from damaging the following vehicles. The last-mentioned condition does not have to be met in the case of traveling cross-country; but in this case it is necessary to ensure that the casing will not set down in uneven country.

These and other objects and advantages of the invention will appear more clearly in the accompanying drawings, in which:

FIG. 1 shows a front elevation of a rear casing according to the invention.

FIG. 2 shows a side elevation of the rear casing according to FIG. 1.

FIG. 3 shows a section taken along the line III—III of FIG. 1.

Figure 4:
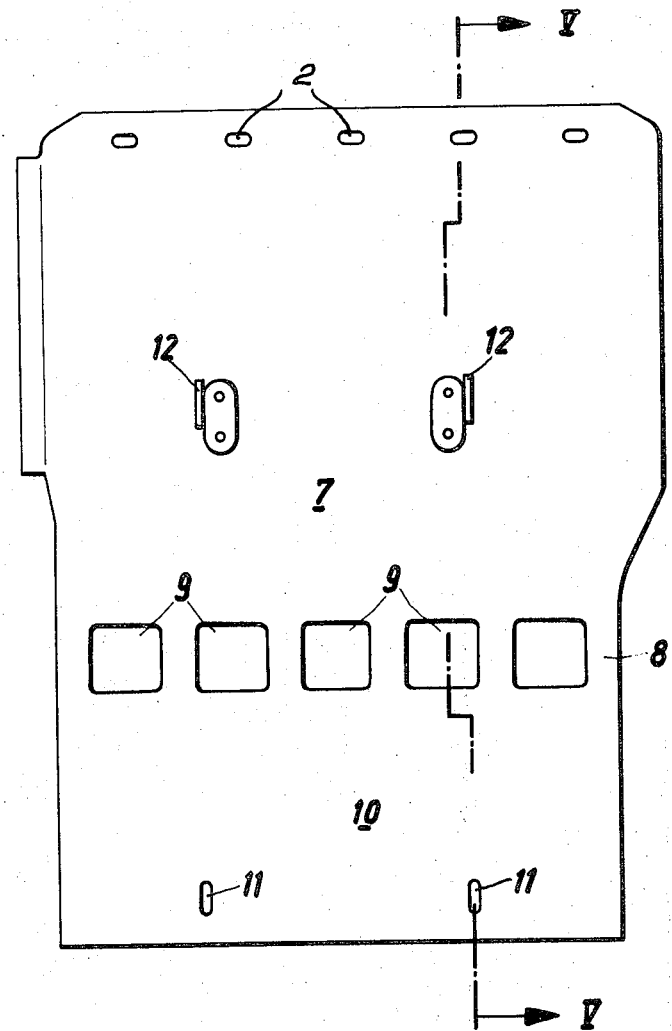
FIG. 4 shows a front elevation of another casing according to the invention.

The casing according to the invention is characterized primarily in that the casing consisting of an elastic material is variable in length. This is achieved in the simplest manner by providing the casing with an articulation point which is formed by a reduction in the wall thickness of the casing. The articulation point can also be formed, however, by recesses in the casing arranged side by side. The articulation points according to the invention are free from wear and tear and require no maintenance, whereas articulation points formed by means of hinges become unusable in a comparatively short time as a result of wear or fouling.

For fixing the lifted lower part of the casing hooks are provided in the upper part, and holes or slots are provided in the lower part.

A further feature of the invention consists in that the casing provided for the rear of the vehicle has an angular shoulder on its outer end. If the rear casing should swivel out of the lower range of the side casing as a result of the wind caused by travel or as a result of objects thrown up, the angular shoulder prevents the rear casing from swivelling back without remaining suspended on to the side casing. Furthermore, the angular shoulder supports the side casing so that the latter cannot impinge upon the rear drive parts.

Referring now to the drawings in detail, the rear casing 1 shown in FIGS. 1 to 3 is provided with longitudinal slots 2. The slots 2 serve for fixing the rear casing 1 onto the vehicle. More or less underneath the middle of the rear casing 1, an articulation or joint section 3 is formed by reducing the wall thickness. The rear or stern casing 1 has in its upper part holes 4 for fitting or receiving hooks and has slots 5 in its lower part. On the outer end of the rear casing 1 there is provided an angular shoulder 6.

Figure 5:
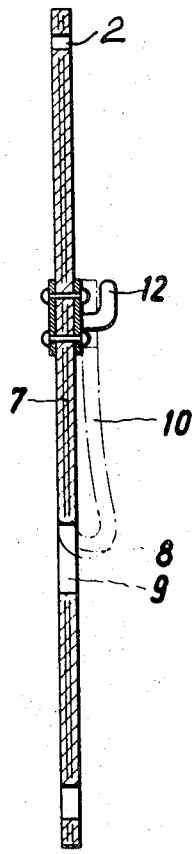
FIG. 5 illustrates a section along the line V—V of FIG. 4.

The casing 7 according to FIGS. 4 and 5 has an articulation or joint section 8 which is formed by recesses 9 arranged side by side. The lower section 10 of the casing 7 is in FIG. 5 indicated in upwardly folded condition by dot-dash lines. Lower section 10 is held in this upwardly folded condition by means of slotted sections 11 which are pushed over the hooks 12.

It is, of course, to be understood, that the present invention is, by no means, limited to the specific showing in the drawings, but also comprises any modifications in the appended claims.

It is also to be understood that while any suitable elastic material may be used for the casing or cover according to the invention, rubber or similar material has proved satisfactory for making the casing or cover according to the invention.

What we claim is:

1. A cover for ballistic protection of track-laying and wheel-equipped vehicles which has a body including upper and lower ends of predetermined thickness adjoining less material therebetween to make possible a variable length by upward tilting thereof and being of an elastic material, the lower portion of said cover being foldable upwardly onto the upper portion of said cover, one of said portions being provided with hook means and the other one of said portions being provided with eyes adapted selectively to engage said hook means to thereby hold the lower portions in upwardly folded condition onto said upper portions.

2. A cover for ballistic protection according to claim 1, which has its upper portion provided with means for detachably suspending said cover on track-laying and wheel-equipped vehicles.

3. A cover for ballistic protection according to claim 1, which has a strip-shaped section of reduced thickness between its upper and lower ends thereby forming a section acting as an articulate joint between the cover sections above and below said strip-shaped section.

* * * * *